(12) United States Patent
Hjaltason et al.

(10) Patent No.: US 7,063,855 B2
(45) Date of Patent: Jun. 20, 2006

(54) COMPOSITION FOR FEEDING PREY ORGANISMS IN AQUACULTURE

(76) Inventors: Baldur Hjaltason, Haajeitisbraut 93, 108 Reykjavik (IS); Gudmundur G. Haraldsson, Klyfjaseli 14, 109 Reykjavik (IS); Olafur Halldorsson, Hjallalundi 12, 600 Akureyri (IS)

( * ) Notice: Subject to any disclaimer, the term of this patent is extended or adjusted under 35 U.S.C. 154(b) by 246 days.

(21) Appl. No.: 10/181,226

(22) PCT Filed: Jan. 15, 2001

(86) PCT No.: PCT/IS01/00001

§ 371 (c)(1),
(2), (4) Date: Jul. 15, 2002

(87) PCT Pub. No.: WO01/50884

PCT Pub. Date: Jul. 19, 2001

(65) Prior Publication Data

US 2003/0124218 A1    Jul. 3, 2003

(30) Foreign Application Priority Data

Jan. 14, 2000    (IS)    ........................................ 5348

(51) Int. Cl.
*A61K 45/00*    (2006.01)
*A01N 63/00*    (2006.01)
*A01N 65/00*    (2006.01)

(52) U.S. Cl. ................... 424/283.1; 119/200; 119/212; 424/93.7; 424/520; 424/523; 424/538; 424/547

(58) Field of Classification Search ................ 435/243, 435/257.1; 424/93.1, 283.1, 93.7, 520, 523, 424/538, 547; 119/200, 212
See application file for complete search history.

(56) References Cited

U.S. PATENT DOCUMENTS

| | | | |
|---|---|---|---|
| 4,593,647 A | 6/1986 | Sorgeloos et al. | 119/205 |
| 4,906,479 A | 3/1990 | Kitagawa et al. | 426/1 |
| 5,132,120 A | 7/1992 | Salte et al. | 426/2 |
| 5,492,938 A | 2/1996 | Kyle et al. | 514/786 |
| 5,656,319 A | 8/1997 | Barclay | 426/574 |
| 5,698,246 A | 12/1997 | Villamar | 426/54 |
| 5,711,983 A | 1/1998 | Kyle et al. | 426/635 |
| 5,746,155 A | 5/1998 | Logan et al. | 119/230 |
| 6,372,460 B1 | 4/2002 | Gladue et al. | 435/134 |
| 6,399,118 B1 | 6/2002 | Zemach et al. | 426/2 |
| 6,582,941 B1 | 6/2003 | Yokochi et al. | 435/134 |
| 6,789,502 B1 | 9/2004 | Hjaltason et al. | 119/51.04 |

FOREIGN PATENT DOCUMENTS

| | | |
|---|---|---|
| WO | 96/17526 | 6/1996 |
| WO | 99/06585 | 2/1999 |
| WO | 99/37166 | 7/1999 |

OTHER PUBLICATIONS

L. A. McEvoy et al., "Lipid and fatty acid composition of normal and malpigmented Atlantic halibut (*Hippoglossus hippoglossus*) fed enriched *Artemia*: a comparison with fry fed wild copepods," Aquaculture 163 (1998), pp. 237-250.

J. C. Navarro et al., "Effects of two *Artemia* diets with different contents of polyunsaturated fatty acids on the lipid composition of larvae of Atlantic herring (*Clupea harengus*)," Journal of Fish Biology (1993) 43, pp. 503-515.

John Sargent et al., "Lipid nutrition of marine fish during early development: current status and future directions," Aquaculture 179 (1999), pp. 217-229.

Douglas R. Tocher et al., "The use of silages prepared from fish neural tissues as enrichers for rotifers (*Brachionus plicatilis*) and *Artemia* in the nutrition of larval marine fish," Aquaculture 148 (1997), pp. 213-231( and 1 page abstract).

G. Mourente et al., "The effects of weaning onto a dry pellet diet on brain lipid and fatty acid compositions in post-larval gilthead sea bream (*Sparus aurata* L.)," Aquatic Sci. & Fish Abs., accession No. 00436265, 1 page.

J. W. Tucker, "Feeding intensively-reared marine fish larvae," Aquatic Sci. & Fish Abs., accession No. 00507558, 1 page.

(Continued)

*Primary Examiner*—David M. Naff
*Assistant Examiner*—Deborah K. Ware
(74) *Attorney, Agent, or Firm*—Hunton & Williams

(57) ABSTRACT

A composition is for feeding aquacultural prey organisms such as *Artemia* and rotifers, comprising a lipid component comprising at least 25 wt % of phospholipids and providing a DHA content of at least 30 wt %. The lipid component is preferably derived from marine organisms such as fishmeal, phytoplankton or zoo plankton biomass. The composition is used for providing prey organisms having a high content of highly-unsaturated fatty acids (HUFAs) suitable for aquaculture of fish including halibut, turbot, bass and crustaceans and molluses.

34 Claims, No Drawings

OTHER PUBLICATIONS

Patent abstract of Japan, JP 03277241, Dec. 9, 1991, vol. 16, No. 93.
Patent abstract of Japan, JP 03277242, Dec. 9, 1991, vol. 16, No. 93.
Database WPI, Section Ch. Week 199404, Derwent Publications Ltd., London, GB; AN 1994-010938, XP002901677 & JP 05 316958 A (Riken Vitamin Co.), Dec. 3, 1993, abstract.
Database WPI Section Ch. Week 199404, Derwent Publications Ltd., London, GB; AN 1994-010938, XP002901677 & JP O5 316958 A (Riken Vitamin Co.,), Dec. 3, 1993, abstract.
U.S. Appl. No. 10/181,225, filed Jul. 15, 2002, Hjaltason et al.
U.S. Appl. No. 10/181,227, filed Jul. 15, 2002, Hjaltason et al.
Patent Abstract of Japan, vol. 1996, No. 08, Aug. 30, 1996 & JP 08 098659 A (Nippon Suisan Kaisha Ltd.), Apr. 16, 1996, English abstract.
Patent Abstract of Japan, vol. 1997, No. 09, Sep. 30, 1997 & JP 09 121784 (Nippon Suisan Kaisha Ltd.), May 13, 1997, abstract.
Patent Abstract of Japan vol. 018, No. 131 (C-1175), Mar. 3, 1994 & JP 05 316958 (Riken Vitamin Co. Ltd.), Dec. 1993, English Abstract.

COMPOSITION FOR FEEDING PREY ORGANISMS IN AQUACULTURE

FIELD OF THE INVENTION

The present invention is within the field of aquaculture, in particular there is provided a lipid composition for feeding prey organisms which are used as feed for fish larvae and larvae of crustaceans and bivalves. More specifically, the invention provides marine lipid compositions which are highly enriched in their content of highly unsaturated fatty acids (HUFAs), in particular docosahexaenoic acid (DHA) and having a high content of DHA-rich phospholipids.

TECHNICAL BACKGROUND AND PRIOR ART

The consumption of seafood species for which there is a high consumer demand such as salmon, trout, halibut and eel is increasing and due to this high demand and limited natural stocks, much effort is spent on developing cost effective aquacultural methods of farming such species. A particularly serious problem is to secure a high survival rate of the hatched larvae of the species being cultivated.

Expansion of the aquaculture industry requires that several problems be addressed, one of the most significant being the difficulty of supplying live prey organisms which provide a nutritionally adequate feed for the larvae. Larval fish in the wild consume a mixed population of phytoplankton prey organisms that provide a balanced nutrition. However, collecting phytoplankton in sufficient quantities to meet the demand in aquaculture is not feasible. As an alternative, selected species of prey organisms, in particular rotifers and *Artemia* species, are presently cultivated and used as feed.

Generally however, such artificially cultivated prey organisms, although they provide adequate amounts of protein and energy, have a lipid composition which is not adequate to cover the requirement for certain HUFAs, in particular DHA and EPA which are essential for the optimum survival, growth and development of larvae. Specifically, it has been shown that a high content of DHA is required and that the ratio between DHA and EPA in the prey organisms should be at least 1:1 and preferably at least 2:1. To provide prey organisms having such a composition in respect of HUFAs it is necessary to cultivate the organisms in the presence of enrichment compositions having a high content of DHA, preferably at least 20 wt % and a ratio of DHA to EPA exceeding the ratio aimed at in the prey organisms, such as at least 3:1 and preferably higher.

Currently, this problem is being addressed by cultivating the prey organisms in the presence of enrichment compositions permitting the organisms to be enriched in respect of these essential fatty acids. However, presently available commercial compositions for that purpose such as emulsion products sold under the tradename Selco™, do not meet the above requirements in that the DHA content is relatively low and/or the DHA:EPA ratio is not high enough. Using *Artemia* enriched with these commercial compositions survival rates of fish larvae in the range of 12 to 15% have been reported (McEvoy et al. Aquaculture 163 (1998) 237–250; Navarro et al. J. Fish Biol. 43 (1993) 503–515). In this context, survival rates are defined as survival percentage from the first feeding through metamorphosis. For cost-effective aquaculture production a larval survival rate of 50% and preferably higher should be obtained.

Other commercially available compositions for prey organism enrichment are products sold under the tradename Algamac™ containing up to 14 wt % of DHA, and tuna orbital oil (TOO) that contains up to 30 wt % of DHA.

WO 99/37166 discloses a method for the enrichment of live prey organisms with nutrients essential for fish larvae based on the use of dry fatty acid soap powders of HUFAs obtained from the waste stream of marine algae oil extraction. The raw material for providing these powders has a content of phospholipids and about 28 wt % of free fatty acids and it contains about 23 wt % of DHA but apparently no other n-3 fatty acids. *Artemia* enrichment levels of about 2.7% DHA of dry weight are disclosed.

Another material intended for use in aquaculture is described in WO 99/06585. Examples disclose a DHA content of 24 wt %, but the phospholipid content is not disclosed. The material however, contains a high proportion of free fatty acids (about 32–37 wt %) and a high content of non-lipid material (about 39–44 wt %), which may reduce the lipid uptake efficiency of prey animals. A high content of free fatty acids is generally considered harmful for fish larvae and juveniles.

Neither of the two last-mentioned materials is fish-based and they lack many HUFAs found in fish, such as EPA and other n-3 fatty acids.

In a recent review by Sargent et al. (Aquaculture 179 (1999) 217–229) it is emphasized that in addition to the requirement in respect of HUFAs, fish larvae have a dietary requirement for phospholipids and it is stressed that the ideal diet for fish larvae is a diet having a composition similar to the yolk of the eggs. According to these authors fish egg yolk contains about 10 wt % (on a dry matter basis) phospholipids which contain about 17 wt % of DHA an about 9 wt % of EPA. These authors conclude in their review that a problem remains with respect to how to construct such a diet on a commercial scale from currently available materials.

To our knowledge, it has not been possible, with the use of the above-mentioned commercial feed compositions, or other prior art experimental compositions, to obtain DHA enrichment levels in *Artemia* that approach an ideal, egg yolk-similar diet.

It has now been found that it is possible to provide a lipid composition for enriching aquacultural prey organisms based on the use of DHA-rich phospholipids isolated from abundantly available marine organism materials such as fish meal. By using this starting material it has become possible to provide enrichment compositions on a commercial scale, which make it possible to provide prey organisms having, in respect of HUFAs and phospholipids, a composition which is very close to that of fish egg yolk and which are therefore highly appropriate to secure optimum survival, growth, pigmentation and morphogenesis of fish larvae such as halibut larvae.

SUMMARY OF THE INVENTION

Accordingly, in a first aspect the present invention pertains to a composition for feeding prey organisms for use in aquaculture, comprising a lipid component comprising at least 25 wt % of phospholipids, the composition providing a DHA content of at least 30 wt %. In useful embodiments the source of the phospholipid-rich lipid component is abundantly available marine organism materials such as fishmeal. This composition according the invention is particularly useful for providing *Artemia* species and rotifers having an appropriate lipid composition for fish larvae.

In a further aspect the invention provides an emulsion comprising as the lipid phase the above composition.

In a still further aspect the invention relates to method of manufacturing a composition as defined above, comprising the steps of separating from a marine organism material a crude lipid component comprising triglycerides and phospholipids, followed by a phospholipid enrichment step comprising adding, at a temperature where triglycerides do not precipitate, a solvent to the crude lipid component and cooling the mixture to precipitate triglycerides to obtain a lipid fraction comprising at least 25 wt % of phospholipids.

There is also provided a marine lipid composition comprising at least 50 wt % of phospholipids.

DETAILED DESCRIPTION OF INVENTION

The composition according to the invention, for feeding prey organisms comprises as its main component a phospholipid-rich component.

In the present context, the expression 'prey organisms' refers to any marine organism that can be used as live feed for larvae of marine species that are produced in aquacultural facilities. A general review of such prey organisms can be found in Lavens & Sorgeloos (eds.) "Manual on the production and use of live food for aquaculture" published by FAO (1995) which is hereby incorporated by reference. Accordingly, the most commonly used prey organisms include several classes and genera of microalgae, rotifers, *Artemia*, zooplankton including copepods, cladocerans, nematodes, and trochophora larvae.

As used herein, the term 'aquaculture' is to be understood in its broadest sense and it includes any production of any aquatic species produced under aquacultural conditions, such as fish species, including as examples salmon, trout, carp, bass, bream, turbot, sole, milkfish, grey mullet, grouper, bream, halibut; crustaceans such as shrimp, lobster, crayfish and crabs; molluscs such as bivalves.

A common feature of these aquatic species is that the life cycle includes one or more larval stages which may have very specific nutritional requirements and accordingly the provision of live prey organisms meeting this requirement is an essential factor for successful aquacultural production. As mentioned above, one such specific requirement is a high content of the essential fatty acid DHA, the term 'essential' implying that the prey organisms are not capable of de novo synthesis of such compounds. The composition of the present invention has a DHA content of at least 30 wt %, such as in the range if about 30 to 35 wt %, or the range of about 35–40 wt % preferably at least 40 wt %, such as at least 50 wt % including at least 60 wt %.

In order to provide a composition having this high content of DHA, the lipid components of the composition must be selected so as to provide the desired amount of DHA. In useful embodiments, the phospholipid-rich component provides the required amount of DHA. However, in other embodiments the DHA content of the phospholipid component may not be sufficient. In such cases, at least one further lipid component that provides an adequate amount of DHA must be incorporated. Typically, such a further lipid component contains at least 20 wt % of DHA, preferably at least 30 wt % of DHA, more preferably at least 40 wt % of DHA, for example at least 50 wt % of DHA. In preferred embodiments, the further lipid component includes at least 60 wt % of DHA, such as at least 70 wt % DHA, including at least 90 wt % DHA.

If required, the further DHA-rich lipid component is incorporated in the composition of the invention in an amount that at least results in a total DHA content of the composition which is at least 30 wt %. Depending on the DHA content of the phospholipid-rich component, the amount of the further lipid component required may be in the range of 5–99 wt %. In certain embodiments of the invention the amount of the further lipid component is in the range of 50–95 wt %, such as a range of about 60–80 wt %, such as e.g. 70–75 wt %.

The source of the further lipid component may be any naturally occurring lipids (preferably comprising glycerides, such as triglycerides or diglycerides) containing at least 20 wt % of DHA and any such lipids synthesized chemically or enzymatically. Examples of naturally occurring DHA-rich lipid are tuna orbital oil (TOO) and lipids isolated from microbial cells having a high content of DHA, such as algae including *Chlorella* and *Crypthecodinium* species, certain yeast species such as *Saccharomyces*, *Morteriella*, *Schizochytrium* and *Thraustochytrium*. As an alternative to using naturally occurring DHA-rich lipids, such lipids can be synthesized chemically or enzymatically. In a useful embodiment of the invention such a lipid is provided as a glyceride by contacting DHA as a free fatty acid and glycerol in the presence of chemical catalysts or an enzyme capable of forming glycerides from the reactants, such as a lipase including a lipase isolated from *Candida antarctica*.

It has been found particularly useful to use fish-based materials as lipid sources for the composition according to the invention (e.g., as sources for the phospholipid containing component, or of the further DHA-rich component, or both). In addition to DHA, such materials also provide other valuable HUFAs (particularly n-3 HUFAs) that are characteristic of fish (such as 20:5 (EPA), 18:3, 18:4, and 20:4 fatty acids), and which are found in the natural diet of fish larvae and in fish egg yolk, and are considered beneficial for successful enrichment of prey organsims for rearing of fish. In an advantageous embodiment the enrichment composition has a total content of HUFAs of at least 30 wt %, for example at least 40 wt %, preferably at least 50 wt %, such as at least 60 wt %. In such compositions, EPA is preferably in the range of 2–15 wt %, such as in the range of 5–10 wt %, and other n-3 HUFAs than DHA and EPA are preferably in the range of 2–25 wt %, preferably in the range of about 5–15 wt %, such as e.g. about 10 wt %. In further advantageous embodiments the total content of n-3 HUFAs is at least 50 wt %, such at least 60 wt %.

As mentioned above, the composition of the invention comprises as a major component a phospholipid-rich component comprising at least 25 wt % phospholipids. In the present context the term 'phospholipids' is used to describe a class of lipids containing phosphoric acid as a mono or diester. Thus, phospholipids include phosphatidyl choline (PC), phosphatidyl ethanolamine (PE), phosphatidyl inositol (PI), phosphatidyl glycerol (PG), phosphatidyl serine (PS), and phosphatidic acid (PA). The term 'lecithin' is also commonly used for mixtures of the above phospholipids. The present inventors have found that the distribution of the members of phospholipid class may have significant impact on the ability of the composition of the invention to secure high survival and good pigmentation rates of fish larvae. In particular, it has been found that the composition of the phospholipids in herring meal is such that a particularly high rate of correct pigmentation of fish larvae is achieved.

In accordance with the invention any phospholipid-rich component can be used. However, presently preferred phospholipids are phospholipids isolated from marine organism materials, including fresh materials and dried materials. Fresh materials include for example viscera from fish and other marine animals, flesh of fish, fish eggs, squids, molluscs and a planktonic biomass. Dried materials include, in particular, fishmeals such as meals of herring, capelin, mackerel, menhaden, sardine, anchovy, horse mackerel, and blue whiting and meals of planktonic organisms. Such marine source materials from fish sources, provide as mentioned earlier, not only a high content of DHA, but also EPA and other n-3 PUFAs, characteristic of fish, and are to an extent similar to the natural diet of fish larvae.

It is well known that the quality of commercial fishmeals can vary considerably. In particular, fish meals of poor quality have undergone more or less advanced deterioration of the lipids including oxidation and hydrolysis. For the purposes of the present invention it is particularly preferred to use commercial fishmeals of a high quality as a source of the phospholipid-containing component. High quality fish meal is defined in this context is with the following parameters relating to quality and freshness: 'total volatile nitrogen' (TVN) should be less than 50 mg/100 g measured as described in Antonacopoulus, N. Handbuch der Lebensmittelcheme, vol. III/2, Springer Verlag, Berlin (1968); and mink digestability of protein should be at least 90%.

In one preferred embodiment, the phospholipid-containing component has a content of phospholipids of at least 30 wt %, preferably at least 40 wt %, such as at least 50 wt %, for example at least 60 wt %, including at least 70 wt % of phospholipids, or even higher. Provided a phospholipid-containing component is selected that has a sufficiently high DHA content, the composition of the invention may comprise this component as the sole lipid-containing component. However, as mentioned above, it may be required to supplement the phospholipid-containing component with a further lipid component that has a high content of DHA. In that case, the proportion of the phospholipid-containing composition is in the range of 1–99 wt %, such as in the range of 2–75 wt % including the range of 5–50 wt %, such as in the range of 5–25 wt %, including about 5 wt %, about 10 wt %, and about 15 wt %, or in the range of about 25–50 wt %.

As mentioned above, it has been shown that not only a high content of DHA is required in the feed for fish larvae, but the ratio between DHA and EPA in the prey organisms is of significance for the survival and development of the larvae of the cultured species. It is generally recognized that the DHA:EPA ratio in the prey organisms should be at least 1:1 and preferably at least 2:1. However, it has been found that in order to achieve this desired ratio in the prey organisms, a significantly higher ratio may be required in the enrichment composition for the prey organism. Accordingly, the enrichment composition of the invention has a DHA:EPA wt. ratio in the range of 1:1 to 10:1, such as 2:1 to 8:1, including the range of 4:1 to 6:1.

As stated by Sargent et al., supra, other HUFAs may be of significance, such as for example arachidonic acid. Accordingly, an enrichment composition according to the invention including a sufficient amount of arachidonic acid is contemplated. If required, the content of arachidonic acid in the composition can be in the range of 1–20 wt % of the total fatty acids, such as for example 2–10 wt %.

It is generally known in the state of the art, that a high content of free fatty acids may be harmful for fish juveniles. Preferred embodiments of the composition of the present invention have a low content of free fatty acids, such as a total content of less than about 10 wt %, including less than about 5 wt %, more preferably less than about 3 wt %, such as less than about 1 wt %.

In useful embodiments the enrichment composition of the invention comprises additional components including emulsifiers, immunostimulants such as for example glucans or alkoxyglycerols, vitamins, antioxidants, mineral, and arachidonic acid. Suitable emulsifiers include Chremophore A25™ available from BASF, VOLPO™ from Croda, soy lecithin, phospholipids, glycerides and fatty acids including soaps.

Vitamins which may be incorporated in the composition include any water-soluble vitamin such as vitamin B and vitamin C, and any water insoluble vitamin A, vitamin D, and vitamin E. It has been found that a high content of vitamin C may have a significant impact on the performance of the enrichment composition with respect to the survival and development of the larval predators (Merchie, G.; Lavens, P.; Sorgeloos, P. *Effects of dietary vitamin C on fish and crustacean larvae,* Proceedings Larvi'95, Ghent (1995); Merchie, G. *Nutritional effect of vitamin C on the growth and physiological condition of the larvae of aquaculture organisms,* Thesis, 1995, University in Ghent; Merchie, G., et al. Aquaculture, 134 (1995) 325–337.) Accordingly, in useful embodiments the content of vitamin C may be in the range of 1–15 wt %, such as for example 5–10 wt %. Useful antioxidants include TBHQ, ethoxyquin, BHT, BHA, vitamin E, and vitamin C.

It will be appreciated by the skilled person that the enrichment composition of the invention can be used as a convenient carrier for pharmaceutically active substances such as for example antimicrobial agents and immunologically active substances including vaccines against bacterial or viral infections, and any combination hereof.

The composition according to invention can be provided as a liquid, pourable emulsion, or in the form of a paste, or in a dry form, for example as a granulate, a powder, or as flakes. When the composition is provided as an emulsion, preferably a lipid-in-water emulsion, it is preferred that it is in a relatively concentrated form. Such a concentrated emulsion form can also be referred to as a pre-emulsion as it can be diluted in one or more steps in an aqueous medium to provide the final enrichment medium for the prey organisms. In preferred embodiments, such a preemulsion comprises as the lipid phase at least 50 wt % of the enrichment composition according to the invention.

As it appears from the above, the enrichment composition can be used for enriching aquacultural prey organisms with respect to essential HUFAs and phospholipids.

In a further aspect, the present invention provides a method of manufacturing an enrichment composition as described above. The method comprises in a first step the separation of a crude lipid component from a marine organism material as defined above. The separation can be accomplished by any conventional method for separating lipids from organic material, such as an extraction using any suitable solvent, including organic solvents such as alcohols including ethanol and propanols; hydrocarbon solvents e.g. alkanes such as a pentane, hexane, or mixture of alkanes or cyclic or aromatic hydrocarbon solvents; ethers;esters, or a mixture of these or other solvents found to be suitable. Use of supercritical extraction is also contemplated. Other means of separating phospholipids from the source materials may include chromatography, centrifugation, compression, thermal treatment or any combination thereof. In a second step, the phospholipid fraction of the crude lipid component is enriched by subjecting the lipid component to a treatment resulting in an at least partial precipitation or solidification of the triglyceride fraction, which can subsequently be removed. The treatment advantageously comprises the addition of a suitable solvent, such as one of those above-mentioned to the crude lipid component, at a temperature where the triglycerides do not precipitate followed by cooling the lipid/solvent mixture to a temperature where a significant portion of the triglycerides precipitates. The precipitate is then removed and the solvent phase is evaporated to obtain a phospholipid-rich component. This treatment can be repeated one or more times and the resulting aliquots of phospholipid-enriched components can be combined. Suitable raw materials for providing the phospholipid-rich component include those marine organism materials as described above.

As mentioned above, it may be required to supplement the phospholipid component with a further lipid component having a high DHA content. Accordingly, the method of the invention includes the embodiment where the phospholipid component is combined with such a DHA-rich component as it is described above.

In a further aspect, the invention provides a novel marine lipid composition comprising at least 50 wt % of phospholipids which can be made by the above method. Such a composition may contain at least 75 wt % of phospholipids, and even at least 90 wt % phospholipids. Such a composition may, as it is described above, be used in the enrichment composition of the invention. However, other uses of such a composition is contemplated, for example as a dietary component in food products, including infant formulas, and nutritional compositions administered parenterally or via tubes, or as a pharmaceutically active agent and as a component in cosmetics.

The marine lipid composition according to the invention can be provided in any suitable form including the forms described above for the enrichment composition.

EXAMPLE 1

Laboratory Scale Isolation of a Phospholipid-rich Lipid Component from Capelin Fish Meal To 100 g capelin fishmeal was added 400 mL ethanol (about 99% v/v) and the mixture was stirred at room temperature for 3 h. The meal residue was separated by filtration and the ethanolic filtrate distilled in vacuum on a rotary evaporator to obtain 10–11 g of a crude lipid fraction containing about 80 wt % lipid of the following composition: 54 wt % phospholipids (PL), 4 wt % free fatty acids (FFA), and 42 wt % triglycerides (TG). The extraction procedure was repeated on the separated meal residue which yielded a further 1.5 g of crude lipid.

The combined crude lipid fractions were purified by addition of ethanol at a wt.:vol. ratio of 1:5 and the resulting suspension was left to stand at 4° C. overnight causing a substantial part of the triglycerides to precipitate. The ethanolic phase was separated and subjected to distillation using a rotary evaporator to yield a phospholipid enriched fraction as a red-yellowish dense, syrupy material (6.5–6.8 g; containing about 71% lipids of the composition shown below. (Numbers in left-most column refer to the number of carbons and double bond in the fatty acids of the lipid components, DHA is 22:6 and EPA 20:5):

|      | PL 71% | TG 23% | FFA 6% | Total 100% |
|------|--------|--------|--------|------------|
| 14:0 | 4.1    | 12.1   | 5.7    | 4.3        |
| 16:0 | 22.5   | 14.5   | 30.3   | 20.8       |
| 16:1 | 4.9    | 16.7   | 6.2    | 6.4        |
| 18:0 | 0.0    | 0.0    | 3.7    | 1.3        |
| 18:1 | 9.6    | 16.9   | 15.5   | 13.4       |
| 18:2 | 0.0    | 2.4    | 0.0    | 1.4        |

-continued

|      | PL 71% | TG 23% | FFA 6% | Total 100% |
|------|--------|--------|--------|------------|
| 18:3 | 0.0    | 0.0    | 0.0    | 0.6        |
| 18:4 | 2.3    | 7.5    | 0.0    | 2.6        |
| 20:1 | 2.3    | 6.2    | 5.2    | 4.2        |
| 20:4 | 0.0    | 0.0    | 0.0    | 0.6        |
| 20:5 | 23.5   | 11.4   | 15.6   | 13.2       |
| 22:1 | 0.0    | 3.8    | 0.0    | 3.5        |
| 22:4 | 0.0    | 0.0    | 0.0    |            |
| 22:5 | 0.0    | 0.0    | 0.0    | 1.0        |
| 22:6 | 30.8   | 6.9    | 17.9   | 19.4       |
|      | 100.0  | 100.0  | 98.5   | 92.7       |

EXAMPLE 2

Laboratory Scale Isolation of a Phospholipid-rich Lipid Component from Herring Fish Meal Essentially the same procedure as described in Example 1 was used to obtain a phospholipid-rich component from herring meal with the following lipid composition:

|      | PL 81% | TG 5% | FFA 14% | Total 100% |
|------|--------|-------|---------|------------|
| 14:0 | 3.2    | 21.0  | 11.3    | 5.2        |
| 16:0 | 25.2   | 14.8  | 24.1    | 24.5       |
| 16:1 | 1.7    | 13.0  | 6.0     | 2.9        |
| 18:0 | 1.2    | 0.0   | 2.5     | 1.3        |
| 18:1 | 5.9    | 10.8  | 10.3    | 6.8        |
| 18:2 | 0.7    | 0.0   | 1.4     | 0.8        |
| 18:3 | 0.4    | 0.0   | 1.4     | 0.5        |
| 18:4 | 0.8    | 8.5   | 5.0     | 1.8        |
| 20:1 | 0.8    | 3.6   | 3.7     | 1.3        |
| 20:4 | 0.7    | 0.0   | 1.3     | 0.7        |
| 20:5 | 14.9   | 13.8  | 12.1    | 14.4       |
| 22:6 | 38.2   | 7.8   | 15.4    | 33.5       |
|      | 93.7   | 93.3  | 94.5    | 93.7       |

As seen above, herring meal provides a highly preferred material for a phospholipid-rich component according to the invention, with a high proportion of DHA-phospholipid.

The ethanolic extraction procedure of Examples 1 and 2 can be scaled up with conventional methods by the person skilled in the art, similar to what is described in Example 3 with a different solvent system.

EXAMPLE 3

Large Scale Isolation of a Phospholipid-rich Lipid Component from Squid Mantles

Minced squid (150 kg) was added to 300 L of isopropanol and the mixture was agitated rather vigorously for 4–6 h and left to stand overnight. Subsequently, the mixture was filtered and 300 L of hexane were added to the filtrate and mixed. This resulted in two phases which were allowed to separate. The upper phase, which largely consisted of hexane and isopropanol was separated and subjected to distillation in several rounds in vacuum using a 50 L rotary evaporator to yield a total of 2.2 kg of a phospholipid enriched fraction as a brown-yellowish wax having a phospholipid content of about 65 wt % and the following total fatty acid composition:

| | |
|---|---|
| 14:0 | 1.9 |
| 16:0 | 28.3 |
| 16:1 | 0.6 |
| 18:0 | 2.9 |
| 18:1 | 3.2 |
| 18:2 | 0.2 |
| 18:3 | 0.0 |
| 18:4 | 0.2 |
| 20:1 | 2.7 |
| 20:4 | 1.4 |
| 20:5 | 13.8 |
| 21:5 | 0.0 |
| 22:1 | 0.0 |
| 22:6 | 40.4 |
| | 95.5 |

EXAMPLE 4

Preparation of an Enrichment Composition for Fish Larvae Prey Organisms

A composition for prey organisms such as *Artemia* species was prepared by combining and mixing the following ingredients:

TABLE 4.1

| | |
|---|---|
| phospholipid-rich component from squid mantles (Example 3) | 9.7 g |
| TG 4010 (TM), Croda, essentially triglycerides w/≈40 wt % DHA | 78.0 g |
| vitamin C (ascorbyl palmitate) | 8.5 g |
| co-emulsifer, BASF Chremophore A25 (TM) | 1.6 g |
| Glucan Macroguard (TM) (immunostimulant) | 0.8 g |
| vitamin A (vitamin A palmitate, 1 mill i.u./g) | 0.190 g |
| vitamin E (DL-alpha tocopherol acetate) | 0.155 g |
| vitamin B (thiamine hydrochloride) | 1.2 g |
| TBHQ (antioxidant) | 0.036 g |
| Ethoxyquin (antioxidant) | 0.036 g |
| Total | 100 g |

The TG 4010 material used as a DHA-rich component in the composition is derived from fish oil-based material which is enriched for DHA, it comprises 40 wt % DHA, about 10 wt % EPA and about 10 wt % other n-3 HUFAs. The fatty acids are mostly in the form of triglycerides and the material has a very low free fatty acid content.

Other materials have been tested as sources of a DHA-rich component, such as TG 5010 (also from Croda) which has a DHA content of about 50 wt %, and enzymatically highly DHA-enriched triglycerides.

EXAMPLE 5

Use of Enrichment Composition for Cultivating *Artemia*

*Artemia* cysts were hatched under optimal conditions (in seawater, 27–29° C., pH about 8, oxygen content above 4 mg/L). The newly hatched naupliar *Artemia* were rinsed and put in 250 L tanks to give a density of 200.000/L. Temperature was kept at 25–28° C., oxygen content at 5–6 mg/L and pH buffered at 7.5 with sodium bicarbonate (2 g/L). The tanks were aerated by passing atmospheric air through perforated hoses at bottom of tanks. Enrichment composition as described in Example 4 was added to the tanks to a concentration of 0.2 g/L and the same amount added 10 h later. 24 h after the first addition of enrichment composition the *Artemia* has the following lipid composition (31% dw (dry weight) of lipids):

| | PL 16% | TG 76% | FFA 8% | Total 100% |
|---|---|---|---|---|
| 14:0 | 8.8 | 1.0 | 3.1 | 0.8 |
| 16:0 | 15.0 | 8.8 | 36.0 | 11.1 |
| 16:1 | 2.6 | 3.2 | 3.1 | 2.5 |
| 18:0 | 6.4 | 2.7 | 6.3 | 4.2 |
| 18:1 | 25.2 | 15.6 | 13.0 | 17.1 |
| 18:2 | 4.2 | 3.5 | 1.8 | 3.3 |
| 18:3 | 13.2 | 19.2 | 6.5 | 14.7 |
| 18:4 | 2.2 | 3.1 | 1.7 | 2.4 |
| 20:1 | 1.6 | 1.0 | 0.0 | 0.9 |
| 20:4 | 2.8 | 2.1 | 0.0 | 2.2 |
| 20:5 | 12.5 | 10.2 | 4.4 | 9.5 |
| 22:1 | 0.0 | 0.0 | 0.0 | |
| 22:4 | 0.0 | 1.1 | 0.0 | 1.2 |
| 22:5 | 0.0 | 1.0 | 0.0 | 1.1 |
| 22:6 | 4.6 | 20.0 | 14.8 | 18.9 |
| | 99.0 | 92.5 | 90.7 | 90.0 |

The *Artemia* thus obtained has a highly enriched total concentration of DHA in accordance with the invention and is thus particularly suitable for feeding fish larvae such as halibut larvae.

EXAMPLE 6

Use of Enrichment Composition for Cultivating *Artemia*

Newly hatched *Artemia* were placed in 250 L tanks and same conditions as described in Example 5. The *Artemia* were fed a lipid composition mixed 2 wt % Chremophore A25 emulsifier. The lipid composition contained 50 wt % phospholipid composition of Example 3; 25 wt % 'DHA-80', essentially triglycerides comprising 80 wt % DHA, synthesized enzymatically from glycerol and DHA fatty acid using lipase from Candida Antarctica (as described in U.S. Pat. No. 5,604,119); and 25 wt % Lysi-22™ (Lysi hf, Iceland), a fish oil with 22 wt % DHA. The feed composition was added to the tanks to a concentration of 0.2 g/L and the same amount added 12 h later. 24 h after the first addition of enrichment composition the *Artemia* has the following lipid composition (34% dw lipids):

| | PL 25% | TG 72% | FFA 3% | Total 100% |
|---|---|---|---|---|
| 14:0 | 0.9 | 1.1 | 0.0 | 1.3 |
| 16:0 | 13.6 | 10.6 | 32.0 | 11.2 |
| 16:1 | 3.3 | 3.5 | 3.3 | 3.4 |
| 18:0 | 5.8 | 2.2 | 10.6 | 3.3 |
| 18:1 | 26.2 | 15.4 | 15.7 | 15.1 |
| 18:2 | 3.7 | 2.7 | 0.0 | 2.5 |
| 18:3 | 13.8 | 15.0 | 4.4 | 13.7 |
| 18:4 | 2.7 | 2.1 | 0.0 | 2.2 |
| 20:1 | 1.0 | 1.9 | 5.3 | 2.0 |
| 20:4 | 2.1 | 1.7 | 0.0 | 1.9 |
| 20:5 | 13.1 | 8.7 | 5.0 | 9.7 |
| 22:6 | 8.4 | 28.8 | 23.6 | 28.0 |
| | 94.6 | 93.7 | 100.0 | 94.1 |

The *Artemia* obtained has a very highly enriched total concentration of DHA (9.5 wt %) in accordance with the invention as well as other fish-characteristic n-3 HUFAs, and is thus particularly suitable for feeding fish larvae such as halibut larvae.

EXAMPLE 7

Use of Enrichment Composition for Cultivating Rotifers (*Brachionus plichatilis*)

Rotifers were reared under similar conditions as described in Example 5, they were fed with Isochrysis plankton and yeast and enriched for 6 h at 27 C with an enrichment composition as described in Example 4, except that triglycerides TG 5010™ from Croda were used instead of TG 4010, TG 5010 containing about 50 wt % of DHA. The rotifers had the following lipid composition (22% dw lipids):

|      | PL 32% | TG 56% | FFA 13% | Total 100% |
|------|--------|--------|---------|------------|
| 14:0 | 6.6    | 7.8    | 3.3     | 6.9        |
| 16:0 | 25.9   | 4.9    | 15.2    | 13.0       |
| 16:1 | 1.9    | 2.5    | 1.3     | 2.2        |
| 18:0 | 3.6    | 5.7    | 2.7     | 4.7        |
| 18:1 | 4.5    | 4.5    | 5.5     | 4.7        |
| 18:2 | 4.9    | 0.3    | 2.0     | 2.0        |
| 18:3 | 3.1    | 3.2    | 1.9     | 3.0        |
| 18:4 | 2.2    | 6.2    | 2.2     | 4.4        |
| 20:1 | 1.2    | 1.9    | 1.5     | 1.6        |
| 20:4 | 5.0    | 2.3    | 2.2     | 3.2        |
| 20:5 | 10.1   | 14.7   | 14.8    | 13.4       |
| 22:6 | 25.6   | 38.8   | 40.4    | 35.2       |
|      | 94.7   | 92.7   | 93.0    | 94.3       |

The rotifers obtained have a very high total concentration of DHA, as well as containing other n-3 HUFAs and has a very high phospholipid content, and thus exemplifies the efficacy of the composition according to the invention.

EXAMPLE 8

Comparison of Enrichment Compositions for Cultivating *Artemia*

*Artemia* cysts were hatched as in Example 5 and transferred to cultivation tanks where conditions were kept as in Example 3 (except for some difference in temperature, see table). Enrichment compositions were prepared similar as described in Example 4, i.e. with same additives added as in Table 4.1 such as emulsifier, vitamins and about 10% phospholipid-rich component from squid mantles as described in Example 3. The bulk ingredient (about 80%) of the preparations were commercial lipid compositions as listed in Table 8.1. These are AlgaMac 2000™, DHA Selco™, DC DHA™ and feed grade Cod Liver Oil (from Lysi, Iceland). The preparations were added to the tanks to a concentration of 0.2 g/L and the same amount added 10 h later. 24 h after the first addition of enrichment composition the *Artemia* has the following lipid composition:

TABLE 8.1

|      | AlgaMac 2000 | DHA Selco | DC DHA | Cod liver oil | composition from Ex. 2 |
|------|--------------|-----------|--------|---------------|------------------------|
|      |              |           | T during growth |        |                        |
|      | 20° C.       | 27° C.    | 27° C. | 20° C.        | 27° C.                 |
|      |              |           | % dw lipids |           |                        |
|      | 17%          | 24%       | 22%    | 23%           | 31%                    |
| 14:0 | 2.3          | 3.4       | 1.1    | 3.2           | 0.8                    |
| 16:0 | 12.6         | 13.5      | 10.9   | 16.0          | 11.1                   |
| 16:1 | 4.4          | 4.6       | 3.7    | 6.2           | 2.5                    |
| 18:0 | 4.7          | 5.5       | 4.6    | 4.5           | 4.2                    |
| 18:1 | 19.2         | 24.8      | 34.5   | 25.8          | 17.1                   |
| 18:2 | 3.6          | 5.6       | 6.9    | 4.4           | 3.3                    |
| 18:3 | 23.1         | 28.4      | 17.9   | 21.1          | 14.7                   |
| 18:4 | 3.9          | 4.8       | 2.8    | 4.3           | 2.4                    |
| 20:1 | 0.4          |           | 0.9    | 2.8           | 0.9                    |
| 20:4 | 1.3          |           | 1.3    |               | 2.2                    |
| 20:5 | 4.4          | 5.3       | 6.3    | 6.0           | 9.5                    |
| 22:1 |              |           |        |               |                        |
| 22:4 | 2.8          |           | 0.6    |               | 1.2                    |
| 22:5 |              |           | 0.6    |               | 1.1                    |
| 22:6 | 7.8          | 4.1       | 8.3    | 2.9           | 18.9                   |
|      | 90.3         | 100.0     | 89.3   | 97.3          | 90.0                   |

The *Artemia* enriched with the preferred composition according to the invention has clearly a higher enriched total concentration of DHA in accordance with the invention and is thus particularly suitable for feeding fish larvae such as halibut larvae.

EXAMPLE 9

Use of HUFA- and Phospholipid-enriched *Artemia* for Aquacultural Rearing of Halibut Halibut larvae were first fed at 230–250° d. ('°d': multiplication factor of temperature (° C.) and days since hatching, e.g., at 5.2° C. 250° d corresponds to 48 days.) Circular rearing tanks were used, either 3.5 or 7 m$^3$. Larvae were gradually acclimatized to a rearing temperature of 11° C. and a light intensity of 300–500 lux. The larvae were fed *Artemia* twice per day, in the morning and in the late afternoon. The *Artemia* was enriched with an enrichment composition according to the invention 24 h before the morning feed, then stored at 13–15° C. for another 7–8 h for the afternoon feed. Feed rations were adjusted to allow for good digestion of the *Artemia*. Microalgae (Isocrysis sp.) were added to the rearing water to reduce stress and facilitate maximum ingestion rates. Slight aeration was applied in the center of the tanks to homogenize the water quality and the feed particles. Slight circular current was acquired with the inflow to distribute the larvae. Water exchange was increased from 1.2 times per 24 h in the beginning up to 3.3 times per 24 h in the end. Larval rearing tanks were cleaned daily.

Survival rates of over 80% in one tank from start of feed to end of larval stage were observed (90% excluding "gapers": larvae with jaw deformity), and frequently survival rates between 65 and 75% have been observed. On average about 80% of juveniles showed correct pigmentation, but upto 96% correct pigmentation in one tank were observed. Correct pigmentation is defined as a normal pigmentation color on the ocular side and no pigmentation on the blind side. About 65% of juveniles on average but up to 80% in one tank showed correct eye migration, that is having both eyes on the ocular side. Ongoing experiments indicate that even higher average survival and pigmentation rates are obtainable.

The results show that DHA-enriched prey organisms according to the invention are particularly suitable for the rearing of aquatic species such as halibut in terms of high survival rates and quality.

The invention claimed is:

1. A composition for feeding prey organisms for use in aquaculture, comprising 2–75 wt % of a marine organism lipid component comprising at least 25 wt % of phospholipids, and comprising about 5-about 99% of a further lipid component comprising tri- and-or diacylglycerides, and at least one additional component selected from the group consisting of an emulsifier, an immunostimulant, a vitamin, an antioxidant, a mineral, and arachidonic acid; the composition having a fatty acid composition characteristic of fish such that the composition provides a DHA content of at least 30 wt %, an EPA content in the range of 2–15%, and a content of n-3 HUFA, other than DHA and EPA, which include 18:3, 18:4, 20:4, and 22:5 fatty acids in the range of 2–25 wt %, the composition having a ratio of DHA to EPA which is at least 3 and a free fatty acid content of less than 10 wt %.

2. A composition according to claim 1 where the phospholipid-containing component comprises at least 50 wt % of phospholipids.

3. A composition according to claim 2 where the phospholipid-containing component comprises at least 70 wt % of phospholipids.

4. A composition according to claim 1, wherein the further lipid component comprises a DHA content of at least 20 wt %.

5. A composition according to claim 4 where the further lipid component comprises a content of DHA of at least 30 wt %.

6. A composition according to claim 5 where the further lipid component comprises a content of DHA of at least 50 wt %.

7. A composition according to claim 4 where the amount of the further lipid component is about 50-about 95 wt %, calculated on the composition.

8. A composition according to claim 4 where the amount of the phospholipid-rich component is about 5-about 50 wt %.

9. A composition according to claim 4, wherein the further lipid component has a content of DHA of at least 40 wt %.

10. A composition according to claim 1 comprising a DHA content of at least 40 wt %.

11. A composition according to claim 10 where the total content of DHA is at least 50 wt %.

12. A composition according to claim 11 wherein the marine organism lipid component is obtained from a material selected from the group consisting of fish eggs, squid mantles and a planktonic biomass.

13. A composition according to claim 10, wherein the total content of DHA is at least 60 wt %.

14. A composition according to claim 1 wherein the marine organism lipid component is obtained from a fishmeal.

15. A composition according to claim 14 wherein the fishmeal is selected from the group consisting of capelin meal, herring meal, menhaden meal, mackerel meal, anchovy meal, sardine meal, horse mackerel meal, and blue whiting meal.

16. A composition according to claim 14 wherein the fishmeal is a high-quality commercial fish meal.

17. A composition according to claim 1 which is selected from the group consisting of a powder, a granulate, a paste, and flakes.

18. A composition according to claim 1 wherein the total content of HUFAs is at least 40 wt %.

19. A composition according to claim 1 wherein the total content of n-3 HUFAs is at least 50 wt %.

20. A composition according to claim 1, wherein the amount of free fatty acids is less then about 5 wt %.

21. A composition according to claim 1 that further comprises a pharmaceutically active substance.

22. A composition according to claim 21 wherein the pharmaceutically active substance is selected from the group consisting of an antimicrobial agent, an immunologically active substance and a combination hereof.

23. A composition according to claim 22 wherein the immunologically active substance includes a vaccine.

24. A composition according to claim 1, wherein the total content of HUFAs is at least 50 wt %.

25. An emulsion comprising as the lipid phase a composition according to claim 1.

26. An emulsion according to claim 25 comprising at least 50 wt % of the composition.

27. A method of manufacturing a composition according to claim 1 comprising the steps of separating from a marine organism material a crude lipid component comprising triglycerides and phospholipids, followed by a phospholipid enrichment step comprising adding, at a temperature where triglycerides do not precipitate, a solvent to the crude lipid component and cooling the mixture to precipitate triglycerides and removing the precipitate to obtain a lipid fraction comprising at least 25 wt % of phospholipids as said marine organism lipid component in said composition.

28. A method according to claim 27 wherein the marine organism material is selected from the group consisting of a fish meal, fish eggs, squid mantles, and planktonic biomass.

29. A method according to claim 28 wherein the fish meal is selected from the group consisting of capelin meal, herring meal, menhaden meal, mackerel meal, anchovy meal, sardine meal, horse mackerel meal, and blue whiting meal.

30. A method according to claim 27 comprising mixing the lipid fraction comprising at least 25 wt % phospholipids with a further lipid component having a DHA content of at least 20 wt %.

31. A method according to claim 30 wherein the further lipid component is obtained by a process comprising contacting glycerol and a HUFA in the presence of a catalyst or an enzyme capable of combining the glycerol and HUFA, under conditions permitting a glyceride or a mixture of glycerides to be formed.

32. A method according to claim 31 where the enzyme is a lipase, including a lipase produced by *Candida antarctica*.

33. A method according to claim 27 wherein the lipid fraction has a phospholipid content of at least 50 wt %.

34. A method according to claim 27 wherein the lipid fraction has a phospholipid content of at least 75 wt %.

* * * * *